United States Patent [19]

Schneller

[11] Patent Number: 5,081,214

[45] Date of Patent: Jan. 14, 1992

[54] PROCESS FOR THE PREPARATION OF AN AROMATIC POLYETHER

[75] Inventor: Arnold Schneller, Mainz, Fed. Rep. of Germany

[73] Assignee: Hoechst Aktiengesellschaft, Frankfurt am Main, Fed. Rep. of Germany

[21] Appl. No.: 564,043

[22] Filed: Aug. 7, 1990

[30] Foreign Application Priority Data

Aug. 9, 1989 [DE] Fed. Rep. of Germany ....... 3926263

[51] Int. Cl.$^5$ ................................................. C08G 8/02
[52] U.S. Cl. .................................... 528/125; 528/126; 528/128; 528/150; 528/151; 528/154; 528/171; 528/174; 528/220; 528/223; 528/226; 528/373; 528/390; 528/391; 524/787
[58] Field of Search ............... 528/129, 126, 128, 150, 528/151, 154, 171, 174, 220, 223, 226, 373, 390, 391; 524/787

[56] References Cited

U.S. PATENT DOCUMENTS

| | | | |
|---|---|---|---|
| 3,065,205 | 11/1962 | Bonner | 528/180 |
| 4,320,224 | 3/1982 | Rose et al. | 528/125 |
| 4,638,044 | 1/1987 | Kelsey | 528/125 |
| 4,731,429 | 3/1988 | McMaster et al. | 528/127 |
| 4,891,167 | 1/1990 | Clendinning et al. | 560/52 |
| 4,952,665 | 8/1990 | Ebata et al. | 528/219 |

FOREIGN PATENT DOCUMENTS

| | | |
|---|---|---|
| 847963 | of 0000 | Canada . |
| 0195448 | of 0000 | European Pat. Off. . |
| 0244167 | of 0000 | European Pat. Off. . |
| 1545106 | of 0000 | Fed. Rep. of Germany . |
| 2803873 | of 0000 | Fed. Rep. of Germany . |
| 3342433 | of 0000 | Fed. Rep. of Germany . |

Primary Examiner—John Kight, III
Assistant Examiner—Sam A. Acquah

[57] ABSTRACT

A process for the preparation of an aromatic polyether by condensation of dihydric phenols with activated aromatic dihalo compounds or by self-condensation of polynuclear activated halophenols employs a mixture of sodium carbonate and sodium hydrogen carbonate as a condensation auxiliary.

By this means, the relatively low reactivity of the sodium carbonate is enhanced and the reaction rate is significantly increased.

14 Claims, No Drawings

PROCESS FOR THE PREPARATION OF AN AROMATIC POLYETHER

DESCRIPTION

The invention relates to a process for the preparation of an aromatic polyether which contains the groups $-SO_2-$ and/or $-CO-$. These polyethers are designated below as aromatic polyether ketones or as aromatic polyether sulfones according to whether the keto or sulfonyl groups predominate.

Aromatic polyethers are known as valuable categories of polymers having favorable properties. In particular, they have high heat resistance and very good chemical resistance.

Aromatic polyethers can be prepared by an electrophilic polycondensation reaction (Friedel-Crafts reaction) of polynuclear aromatic acid halides (in which at least one aryl radical must have nucleophilic substituents), for example of a phenoxyaryl carbonyl chloride, or by condensation of a dicarboxylic acid halide with an electron rich aromatic, for example a diaryl ether (U.S. application Ser. No. 3,065,205).

Another suitable synthesis is the nucleophilic polycondensation of halophenols, the halogen group being activated by electronegative substituents in ortho- or para-positions, or the polycondensation of dihydric, mononuclear or polynuclear phenols with activated dihaloaromatics. In the nucleophilic polycondensation, the actual agent is the phenolate ion formed from the phenol by the action of alkalis (DE-C-1,545,106 and CA-A-847,963).

The phenolate ions are formed either by reacting the phenol with, for example, alkali metal hydroxides and subsequently eliminating the water of reaction by azeotropic distillation (DE-C-1,545,106) or else by adding alkali metal carbonates or alkali metal bicarbonates to the condensation mixture (CA-A-847,963).

The alkali metal carbonates chiefly used are potassium carbonate, mixtures of sodium carbonate and potassium carbonate (DE-C-2,803,873) and also mixtures of calcium carbonate, sodium carbonate and potassium carbonate (DE-A-3,342,433).

Additives named by other publications are alkali metal acetates (EP-A-0,244,167) and alkali metal halides (EP-A-0,195,448).

In the case of potassium carbonate or potassium bicarbonate, the phenolate formation is very rapid and high molecular weight polyethers can be obtained. The disadvantage of this process is the formation of gel particles which prevent the material from being used in film applications. Furthermore, preparation of the polyether in a reactor gives a material which is contaminated with black particles.

It has also been reported that the sole use of sodium carbonate or sodium bicarbonate gives polyethers having only a low molecular weight, poor color and inadequate mechanical properties (U.S. application Ser. No. 4,320,224).

To shorten the reaction times, the use has also been proposed of a mixture of alkali metal carbonates of various alkali metals as condensation auxiliaries (DE-A-2,803,873). Although, in this procedure, a combination of (a large amount of) sodium carbonate with (a little) potassium carbonate significantly reduces the reaction time relative to the sole use of sodium carbonate, the problems originally associated with potassium carbonate such as gel formation and black particle formation are only reduced and not eliminated. Another publication proposes mixtures of sodium carbonate and/or bicarbonate with potassium fluoride and higher metal halides as a condensation auxiliary (EP-A-0,195,448). However, in the description and in the examples mention or use is made, without exception, of sodium carbonate and/or potassium carbonate with metal halides. Neither the description nor the examples discuss the influence of the bicarbonate. On additionally using potassium fluoride in conjunction with carbonates for the polycondensation with the aid of achieving a higher molecular weight in a shorter reaction time, precautions must be taken concerning the material of the reaction vessels owing to the pronounced corrosiveness of potassium fluoride.

The object of the invention is therefore to provide a process which allows the preparation of aromatic polyethers in comparatively short reaction times using inexpensive and non-corrosive condensation auxiliaries and which gives products of higher quality.

The present invention accordingly provides a process for the preparation of an aromatic polyether by condensation of dihydric phenols with activated aromatic dihalo compounds or by self-condensation of polynuclear activated halophenols in the presence of carbonates of metals from Group I of the Periodic Table as condensation auxiliaries, optionally in the presence of at least one solvent, in which process a mixture of sodium carbonate and sodium hydrogen carbonate is used as the condensation auxiliary.

It is surprising that the relatively low reactivity of the sodium carbonate is enhanced in the polyether synthesis by adding small amounts of sodium bicarbonate and the reaction rate can be significantly increased and thus high molecular weights achieved within a short time. Furthermore, the products obtained in this manner are lighter in color than the polyethers prepared by known processes.

In the process according to the invention, the relative proportions of sodium carbonate and sodium bicarbonate can be varied within wide limits. However, sodium carbonate, which used alone is virtually ineffective, is normally used in excess and combined with an amount of sodium bicarbonate which, used on its own, would likewise generally not be adequate. The mixture of sodium carbonate and sodium bicarbonate is used as a condensation auxiliary normally in amounts such that 0.001 mol to 0.5 mol, preferably up to 0.3 mol, of the sodium bicarbonate is present per mol of sodium carbonate.

Since, as is customary, the condensation reactions are carried out under substantially anhydrous conditions, the carbonates used should preferably also be substantially anhydrous.

The advantages achieved according to the invention are not dependent on the particle size of the carbonate compounds used.

It is even possible to carry out the polycondensation of the reaction components used giving high molecular weight products in a short time, using a mixture of coarseparticle soda (particle size from 200 to 800 $\mu$m) and sodium bicarbonate.

The use of coarse-particle soda prevents unwanted dust formation during filling of the reaction vessel.

The total amount of carbonate is generally adjusted so that at least one mole of metal atoms are present per mole of hydroxyl groups of the phenolic component entering into reaction. In some cases, an excess of carbonate of up to 30 % is appropriate, so that the total amount of carbonate is in most cases 1 to 1.3 mol of metal atoms per mol of hydroxyl groups, according to the invention. "Aromatic polyesthers" are understood to mean polymers which, besides the oxygen atom of the ether linkage, may also contain other atoms and/or groups in the main chain such as sulfur atoms and/or carbonyl, imino, sulfonyl, and sulfoxide groups, alkylidene groups having 1 to 3 carbon atoms in the radical, and also halogenated alkylidene radicals.

The polyethers obtained by the process according to the invention are high molecular weight compounds whose inherent viscosities (measured in a solution of 0.5 g of the polymer in 100 ml of concentrated sulfuric acid) are generally from 50 to 500, preferably from 75 to 300 ml/g.

The polyethers are prepared according to the invention under generally customary conditions and with the reaction of the known reactants (monomers), i.e., for example, of dihydric phenols with activated aromatic dihalo compounds or of polynuclear activated halophenols in which the halogen is located on a different aromatic nucleus from the hydroxyl group, or of halophenols of this type with mutually equivalent amounts of dihydric phenols and activated aromatic dihalo compounds.

In the first case mentioned, i.e. the reaction of dihydric phenols with activated aromatic dihalo compounds, the molar ratio of the two reactants is normally 0.9 to 1.1:1.0. The compounds are preferably used in the molar ratio of 1:1 or with a slight excess of the dihalo compound.

Suitable dihydric phenols are compounds of the formula (1)

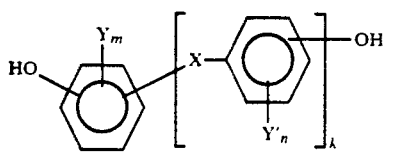
(1)

for example mononuclear diphenols such as hydroquinone, resorcinol or homologs thereof such as methylhydroquinone and phenylhydroquinone.

Other suitable diphenols are those in which two phenol radicals are linked via a direct bond or via atoms or groups such as oxygen, sulfur, carbonyl, sulfonyl, sulfoxide, alkylidene groups having 1-3 carbon atoms in the radical, and also halogenated alkylidene radicals, phenylene, oxyphenyleneoxy and carbonylphenylenecarbonyl. These polynuclear diphenols can likewise be described by the formula (1). In this formula, Y and Y' represent alkyl groups or alkoxy groups each having 1 to 8, preferably 1 to 4, carbon atoms, aryl or aryloxy groups (aryl preferably phenyl or naphthyl) or halogen atoms, m and n, independently of one another, are zero, one, two, three or four (in the case Ar=phenylene) or greater (in the case of other aryl radicals such as naphthylene), preferably zero or 1, and k is zero, 1 or 2. X is an alkylidene or cycloalkylidene group having 1-3 carbon atoms in the alkylidene group, and also perfluorinated derivatives thereof, or represents a direct bond, —O—, —S—, —SO—, —SO$_2$—, —CO—, —C$_6$H$_4$—, —O—C$_6$H$_4$—O— or —CO—C$_6$H$_4$—CO—. Particular preference is given to compounds of the formula (1) in which X is a direct bond, —O—, —S—, —SO$_2$—, —CO—, —CH$_2$—, —C(CH$_3$)$_2$—, —C(CF$_3$)$_2$—, m and n are zero and k is zero or 1.

Examples of diphenols of this type are:
2,2-Bis(4'-hydroxyphenyl)propane, 2,2-bis(4'-hydroxy-3',5'-dimethylphenyl)propane, bis(4'-hydroxyphenyl)-methane, bis(4'-hydroxyphenyl)cyclohexane, 1,1-bis(4-hydroxyphenyl)ethane, 2,2-bis(4'-hydroxyphenyl) -1,1,1,3,3,3-hexafluoropropane, 2,2'-dihydroxydiphenyl, 3,3'-dihydroxydiphenyl, 4,4'-dihydroxydiphenyl, 3,4'-dihydroxydiphenyl, 4,4'-dihydroxydiphenyl ether, 4,4'-dihydroxydiphenyl sulfide, 4,4'-dihydroxydiphenyl sulfoxide, 4,4'-dihydroxydiphenyl sulfone, 4,4'-dihydroxybenzophenone, 1,4-bis(4'-hydroxyphenoxy)benzene, 1,3-bis(4'-hydroxy-phenoxy)benzene, 1,4-bis(4'-hydroxybenzoyl)benzene, 1,3-bis (4'-hydroxybenzenesulfonyl) -benzene, 1,3-bis(4'-hydroxybenzenesulfonyl)benzene.

The activated aromatic dihalo compounds are mononuclear or polynuclear compounds whose halogen atoms are activated by electronegative substituents in the o- or p-position relative to the said halogen atoms. In the case of polynuclear compounds, the halogen atoms are preferably on different benzene rings; the electronegative substituents in this case can form the linkage between the benzene rings. Suitable dihalo compounds are described by the formulae

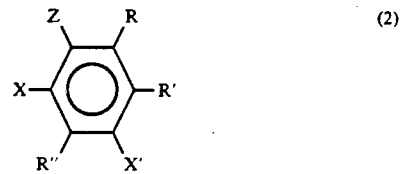
(2)

and

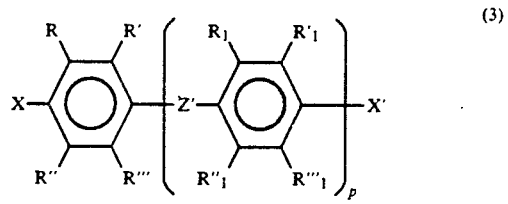
(3)

in which R, R', R", R''', R$_1$, R"$_1$, and R"'$_1$ are identical or different and can be selected from the group comprising hydrogen, alkyl or alkoxy (each of which advantageously has 1 to 8, preferably 1 to 4 carbon atoms), aryl or aryloxy (aryl preferably phenyl or naphthyl). Furthermore, R and R', R" and also R"$_1$, R"' and R"'$_1$ may also be alkylidene bridges or fused-on aromatic rings. Particular preference is given to compounds which are substituted only by hydrogen atoms. Z and Z' are monovalent and divalent electronegative substituents, Z' for example representing —SO$_2$—, —CO—, —SO—, —(R$_2$)—P(O)—, —C—(=CF$_2$)—or —C[=C(CN$_2$)]— and Z being a monovalent electronegative group such as —NO$_2$, —NO, —CF$_3$ or —CN, or Z can be Z'-alkyl (alkyl=C$_1$-C$_8$, preferably C$_1$-C$_4$) or —Z'-aryl (aryl, preferably phenyl or naphthyl); R$_2$ represents alkyl (C$_1$-C$_8$, preferably C$_1$-C$_4$) or aryl (preferably phenyl or naphthyl). p is an integer such as 1, 2 or 3. Where p=1, R' and R$_1$, taken together, may also be a direct bond or an alkylidene bridge. In this case, arylidene preferably represents 1,2-phenylene or 1,2- or 2,3-naphthylene. X and X' are identical or different and are halogen atoms, particular preference being given to F and Cl.

Examples of suitable dihalo compounds are:

2,4-dichloronitrobenzene, 2,4-difluoronitrobenzene, 2,4-difluorobenzophenone, 4,4'-dichlorodiphenyl sulfone, 4,4'-difluorodiphenylsulfone,4,4'-dichlorobenzophenone, 4,4'-difluorobenzophenone, 4,4'-dichlorodiphenyl sulfoxide, 4,4'-difluorodiphenyl sulfoxide, 1,4-bis(4'-chlorobenzoyl)benzene, 1,4-bis(4'-fluorobenzoyl)benzene, 1,3-bis(4'-fluorobenzoyl)benzene, 1,4'-bis (4'-chloro-benzenesulfonyl)benzene, 1,4-bis(4'-fluorobenzenesulfonyl)benzene, 4,4'-bis(4"-chlorobenzoyl)benzophenone, 4,4'-bis(4"-fluorobenzoyl)benzophenone, 2,5-bis(4'-fluorobenzoyl)naphthalene, 3,6-difluoro fluorenone, 3,6-difluorodibenzothiophene-S,S-dioxide, bis-(4'-fluorophenyl)-phenylphosphineoxide, and 1,1-bis(4'-fluorophenyl)-2,2-dicyanoethylene.

Preference is given to the use of compounds of the formula (4)

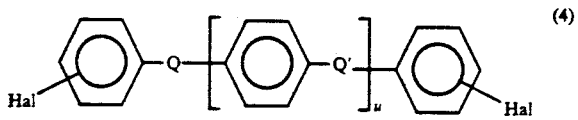

in which Hal are identical or different halogen atoms, preferably F or Cl, in the p- or o-position, Q and Q' are —CO—and/or —SO$_2$—groups and u is equal to zero, 1 or 2.

Halophenols which can be used according to the invention are dinuclear or polynuclear phenols in which the halogen atom is not situated on the ring which is substituted by the hydroxyl group and is activated by an electrophilic group in the ortho- or para-position. These phenols can be represented by the general formula $$X-(Ar-Z')_s-Ar-OH \quad (5)$$
$$\overset{R_r}{|} \quad \overset{R'_t}{|}$$

in which Ar is an arylene radical such as phenylene or 1 5 naphthylene, r, s and t are integers such as 1, 2, 3 or 4; R and R' may be identical or different and are selected from the group comprising hydrogen, alkyl, alkoxy, each having 1-6 carbon atoms, preferably 1-4 carbon atoms in the alkyl radical, aryl or aryloxy. Z' is as defined above. Examples of suitable halophenols are: 4-fluoro-4'-hydroxy-benzophenone, 4-chloro-4'-hydroxybenzophenone, 4-fluoro-4'-hydroxy-diphenyl sulfone, 4-chloro -4'-hydrox-y-diphenyl sulfone, 1-(4'-hydroxy benzoyl)-4-(4"-chlorobenzoyl)benzene, and 1-(4'-hydroxy-benzoyl)-4-(4"-fluorobenzoyl)benzene.

The condensation reaction according to the invention is carried out either in bulk or in the presence of a inert solvent in which the polymer formed is soluble at the reaction temperature. Examples of suitable solvents are: diphenyl sulfone, cyclic aromatic sulfones such as dibenzothiophene-S,S-dioxide or, less preferably, benzophenone and cyclic aromatic ketones, for example fluorenone. Solvents of this type have been described, inter alia, in DE-A-2,803,873. In this case it is advantageous to suspend, at elevated temperature, sodium carbonate and/or sodium bicarbonate in a solution of a benzenoid dihalo compound in which the halogen atoms are activated by SO$_2$ or CO groups in o- or p-positions and then to meter in the benzenoid dihydroxy compound at elevated temperature.

The lower limit of the reaction temperature is set by the melting point of at least one of the components or of the solvent and the upper limit is set by the decomposition temperature of the condensation reactants or of the solvent (if used). Generally, the reaction temperature is within the range of 100° to 400° C., preferably 180° to 350° C., and depends on, among other factors, the reactivity of the condensation reactants and the type of solvent used (if any). It is preferable to operate by starting at a low reaction temperature and increase the temperature gradually or stepwise if the viscosity of the reaction mixture increases.

The condensation process can be carried out in various ways. One method is to charge the reactor with all of the components at room temperature and then to increase the temperature. After the reactants, and if appropriate the solvent, have melted, the reaction commences at elevated temperature, recognizable from, among other indications, the evolution of gas. The mixture is then allowed to react further until the desired viscosity has been reached.

Another preferred method for the described process is first to charge one of the reactants, together with the condensation auxiliary, at room temperature and then to heat the system and continuously add the second reactant at elevated temperature, preferably at 200°-350° C. This procedure allows better control of the reaction, in particular with very active reactants.

If the condensation is to be carried out in the presence of a solvent, it is advantageous to suspend the condensation aid in a solution of the dihalo compound, if appropriate at elevated temperatures up to 190° C. and, after increasing the temperature of the reaction mixture to 200° to 350° C., to add the dihydroxy compound.

If necessary, the condensation reaction can be carried out in the presence of a chain terminator (regulator). Examples of suitable regulators of this type are methyl chloride, t-butyl chloride, 4-chlorodiphenyl sulfone and 4-fluorobenzophenone.

The resulting mixture of polymer and salt and, if appropriate, solvent is worked up by standard methods such as filtration and/or washing with solvents for the salts, for example water, and if appropriate, for the solvent which has been used in the reaction.

The polymers which can be obtained according to the invention are suitable owing to their high heat resistance, their hydrolysis resistance and their other properties for, inter alia, coverings of electric cables, coatings for wires and monofilaments and for moldings in electrical equipment.

In the examples which follow, the inherent viscosity of the resulting polymers was determined in a solution of 0.5 g of the polymer in 100 ml of concentrated sulfuric acid. The inherent viscosity is defined as $$\eta_{inh} = \frac{\ln \eta_{rel}}{c}$$

where $$\eta_{rel} = \frac{t}{t_o}$$

t : flow time of the solution
t$_o$: flow time of the solvent c : concentration of the polymer in g/ml

EXAMPLES

1) A 250 ml four-necked flask fitted with argon purging, stirrer, air-cooler and thermometer was charged with 00 g of diphenyl sulfone and 32.2 g (0.1 mol) of 1,4-bis-(4'-fluorobenzoyl)benzene and heated to 270° C. A mixture of 115 mol % (12.1 g) of anhydrous sodium carbonate (particle size 200-800 μm) and 10 mol % (0.84 g) of sodium bicarbonate (particle size 100 μm) was added and while heating the mixture to 310° C. a 50% by weight solution of diphenyl sulfone and hydroquinone (11.0 g) at a temperature of 250° C. was added dropwise. After a reaction time of 25 minutes, 0.6448 mol of 1,4-bis(4'-fluorobenzoyl)benzene was added to terminate the reaction.

The reaction mixture was cooled and comminuted, the salts and the diphenyl sulfone were extracted using acetone and water alternately. The inherent viscosity (I.V.) is 110.37 g/ml, measured in a solution of 0.5 g of polymer in 100 ml of concentrated sulfuric acid.

2) Comparison 1

Example 1 was repeated but instead of the mixture of sodium carbonate/sodium bicarbonate, 120 mol % (12.6 g) of sodium carbonate (particle size 200-800 μm) was used. After a reaction time of 4 hours, no increase in viscosity was observable. The inherent viscosity of the residue remaining after working up was 7.11 g/l. A thin layer chromatogram also revealed the presence of monomers.

3) Example 1 was repeated but a mixture of 115 mol % (12.1 g) of sodium carbonate (particle size 80 μm) and 10 mol % (0.84 g) of sodium bicarbonate (particle size 100 μm) was used. After a reaction time of 20 minutes, the product had an inherent viscosity of 116.34 g/ml.

4-8) Example 1 was repeated, but various amounts of sodium bicarbonate and sodium carbonate were used (see Table I).

TABLE I

| Example | Na₂CO₃ mol % (80 μm) | NaHCO₃ mol % (100 μm) | Reaction time (min.) | I.V. (ml/g) |
|---|---|---|---|---|
| 4 | 119 | 2 | 45 | 115.71 |
| 5 | 118 | 4 | 40 | 109.15 |
| 6 | 117 | 6 | 25 | 115.63 |
| 7 | 115 | 10 | 20 | 116.34 |
| 8 | 110 | 20 | 10 | 111.21 |
| Comparison 2 | 120 | — | 180 | 70.37 |

9) Comparison 2 (see Comparison 2 in Table I) The procedure of Example 1 was followed using 120 mol % (12.6 g) of sodium carbonate (particle size 80 μm), this giving, after a reaction time of 180 minutes, a polymer having an inherent viscosity of 70.37 g/ml.

As shown in Examples 4-8, the addition of even very small amounts of sodium bicarbonate gives a pronounced acceleration of the reaction. Whereas while using sodium carbonate of particle size 80 μm, the polymer has a solution viscosity of 70 g/ml only after 3 hours (Comparative Example 2), the addition of sodium bicarbonate gives solution viscosities of above 100 g/ml in significantly shorter times.

10) To monitor the viscosity/time profile and thus the polycondensation reaction, a reaction mixture similar to that for Example 1 containing 119 mol % of sodium carbonate and 2 mol % of sodium bicarbonate was sampled at intervals of 15 minutes; these samples were worked up by the procedure of Example 1 and the solution viscosity of the resulting polymer was measured. The results are given in Table II.

TABLE II

| | | Inherent viscosity (g/ml) | | | | | | |
|---|---|---|---|---|---|---|---|---|
| Example | | E* | 15 min. | 30 min. | 45 min. | 60 min. | 75 min. | 90 min. |
| 10 | 119 mol % of soda 2 mol % of bicarbonate | 35.67 | 55.97 | 75.53 | 115.32 | — | — | — |
| 11 | 120 mol % of soda | 24.48 | 38.17 | 43.59 | 49.32 | 57.47 | 60.73 | 65.13 |
| Comparison 3 | 200 mol % of soda | 27.78 | 42.86 | 46.22 | 55.72 | 61.37 | 64.22 | 72.99 |

E* = I.V. at the time of cessation of hydroquinone addition

11) Comparison 3

The procedure of Example 10 was followed, but the amount of sodium carbonate used was 120 or 200 mol %. The results are given in Table II.

It can be seen from this table that the addition of even small amounts of sodium bicarbonate gives a pronounced acceleration of the reaction and a steep rise in viscosity. In contrast, the sole use of sodium carbonate in amounts of 200 mol % (100 % excess) does not give this rapid molecular weight increase. After almost twice the reaction time, the viscosities of the comparative sample are significantly lower than those of the polymer prepared by the processes according to the invention.

I claim:

1. A process for the preparation of an aromatic polyether by condensation of dihydric phenols with activated aromatic dihalo compounds or by self-condensation of polynuclear activated halophenols in the presence of carbonates of metals from Group I of the Periodic Table as condensation auxiliaries, optionally in the presence of at least one solvent, which comprises using a mixture of sodium carbonate and sodium hydrogen carbonate as the condensation auxiliary.

2. The process as claimed in claim 1, wherein the amount of sodium bicarbonate is 0.001 to 0.5 mol per mol of sodium carbonate used.

3. The process as claimed in claim 1, wherein the carbonates are used in amounts such that at least one mole of metal atoms are present per mole of hydroxyl groups of the phenolic component entering into reaction.

4. The process as claimed in claim 1, wherein the condensation reaction is carried out in an aromatic sulfone.

5. The process as claimed in claim 4, wherein diphenyl sulfone is used.

6. The process as claimed in claim 1, wherein a benzenoid dihalo compound of the formula

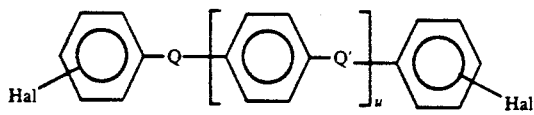

(4)

is used in which Hal are identical or different halogen atoms in the p- or o-position, Q and Q' are —CO— and/or —SO$_2$— roups and u is equal to zero, 1 or 2.

7. The process as claimed in claim 1, wherein the benzenoid dihydroxy compound is a phenol of the formula

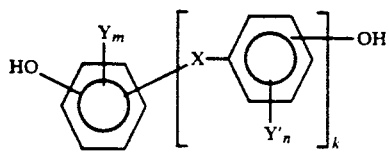

(1)

in which X is a direct bond, —O—, —S—, —SO$_2$—, —CO—, —CH$_2$—, —C(CH$_3$)$_2$— or —C(CF$_3$)$_2$—, m and n are zero and k is zero or 1.

8. The process as claimed in claim 1, wherein a mixture of sodium carbonate and sodium hydrogen-carbonate is suspended at elevated temperature in the dihalo compound which has been dissolved in a solvent and then the dihydroxy compound is added at elevated temperature.

9. The process as claimed in claim 8, wherein the dihydroxy compound is added at 200°–350° C.

10. The process as claimed in claim 1, wherein the condensation is carried out until the inherent viscosity is 50 to 500 ml/g (measured in a solution of 0.5 g of the polymer in 100 ml of concentrated sulfuric acid).

11. The process as claimed in claim 10, wherein the inherent viscosity is 75 to 300 ml/g.

12. The process as claimed in claim 1, wherein the dihydric phenol used is hydroquinone or 2,2-bis(4'-hydroxyp-henyl)propane and the dihalo compound used is 1,4-bis(4'-chlorobenzovl)benzene or 1,4-bis(4'-fluorobenzoyl)benzene, diphenyl sulfone being present.

13. The process as claimed in claim 1, wherein the reaction is carried out in the presence of regulators.

14. The process as claimed in claim 13 wherein the reaction is carried out in the presence of methyl chloride, t-butyl chloride, 4-chlorodiphenyl sulfone or 4-fluorobenzophenone.

* * * * *